United States Patent
Hahnlen

(10) Patent No.: US 11,230,084 B2
(45) Date of Patent: Jan. 25, 2022

(54) METALLIC MESH TRANSITION FOR JOINING FIBER REINFORCED POLYMERS AND METALLIC STRUCTURES

(71) Applicant: HONDA MOTOR CO., LTD., Tokyo (JP)

(72) Inventor: Ryan M. Hahnlen, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 231 days.

(21) Appl. No.: 16/452,185

(22) Filed: Jun. 25, 2019

(65) Prior Publication Data
US 2020/0406579 A1    Dec. 31, 2020

(51) Int. Cl.
*B32B 5/26* (2006.01)
*B32B 5/02* (2006.01)
*B32B 37/18* (2006.01)

(52) U.S. Cl.
CPC .............. *B32B 5/26* (2013.01); *B32B 5/028* (2013.01); *B32B 37/18* (2013.01); *B32B 2262/103* (2013.01); *B32B 2605/00* (2013.01)

(58) Field of Classification Search
CPC .......... B32B 5/26; B32B 5/028; B32B 37/18; B32B 2262/103; B32B 2605/00
See application file for complete search history.

(56) References Cited

U.S. PATENT DOCUMENTS

| 5,557,846 | A | 9/1996 | Wei et al. |
| 7,208,220 | B2* | 4/2007 | Yamasaki ............... B29C 70/00 264/136 |
| 7,959,058 | B1 | 6/2011 | Crane et al. |
| 8,675,335 | B2* | 3/2014 | Wilson .................. B29C 70/443 361/218 |
| 8,722,201 | B2 | 5/2014 | Schiebel et al. |
| 2012/0270025 | A1 | 10/2012 | Russell |
| 2015/0361308 | A1 | 12/2015 | Rezai et al. |
| 2019/0099966 | A1* | 4/2019 | Hahnlen ............. B23K 20/233 |

FOREIGN PATENT DOCUMENTS

EP    3 326 787 A1    5/2018

\* cited by examiner

*Primary Examiner* — Vishal I Patel
(74) *Attorney, Agent, or Firm* — Arent Fox LLP

(57) ABSTRACT

A method of making a hybrid composite component, the method including interleaving one or more metallic mesh laminae with two or more interleaved laminae of a first fiber reinforced composite material, wherein at least a first portion of the one or more metallic mesh laminae extends past a first edge of the two or more interleaved laminae of the first fiber reinforced composite material, and wherein at least a second portion of the two or more interleaved laminae of the first fiber reinforced composite material extends past a second edge of the one or more metallic mesh laminae; and providing one or more abutting laminae of a second fiber reinforced composite material in a position abutting the second edge of the one or more metallic mesh laminae, wherein the one or more abutting laminae of the second fiber reinforced composite material are interleaved with the second portion of the two or more interleaved laminae of the first fiber reinforced composite material. Also provided are composite components provided by the method.

13 Claims, 13 Drawing Sheets

METALLIC MESH TRANSITION FOR JOINING FIBER REINFORCED POLYMERS AND METALLIC STRUCTURES

TECHNICAL FIELD

The present disclosure is directed to a method of joining fiber reinforced composite materials and metallic materials to provide a hybrid composite component.

BACKGROUND

Current methods for joining fiber reinforced polymers and metals generally involve mechanical fasteners and/or adhesives to achieve load transfer between the two joined components. However, such methods raise at least two primary concerns.

First, the inclusion of mechanical fasteners is typically performed after the fiber reinforced polymers have been cured, which requires cutting or punching a hole into the material, resulting in fractures and cracks in the matrix as well as in the fibers that serve as stress concentrators. Such methods therefore ultimately weaken the resulting component. However, when mechanical fasteners are molded into the material during curing, the fastener is permanently fixed in place, making integration into a factory assembly line difficult due to the resulting tight tolerance in fastener placement.

When adhesives are used, the joint strength is fully dependent on the lower of either the adhesive strength or the matrix strength. The fiber reinforcements are not directly engaged in the load path, creating a weak point in the system. Furthermore, close proximity of fiber reinforced polymers to metals poses a galvanic corrosion concern. For example, the carbon fiber of the fiber reinforced polymers may serve as the cathodic material in a galvanic couple with metals, potentially resulting in severe corrosion damage when exposed to an electrolyte such as road spray or salt water. This is typically alleviated using a glass fiber surface mat in the material, thick adhesive layers to prevent bridging by the electrolytic solution, or joining to passivated metal structures, such as stainless steel brackets.

There is thus a need in the art for improved methods of joining fiber reinforced polymers and metals that alleviate these drawbacks.

SUMMARY

The present disclosure is directed to a method of joining fiber reinforced composite materials and metallic materials to provide a hybrid composite component. The method may comprise interleaving one or more metallic mesh laminae with two or more laminae of a fiber reinforced composite material, wherein at least a portion of the one or more metallic mesh laminae extends past an edge of the two or more laminae of fiber reinforced composite material. The method may comprise providing one or more laminae of fiber reinforced composite material in a position abutting at least one of the one or more metallic mesh laminae. The method may further comprise stitching interleaved laminae of the resulting composite component and/or curing the resulting composite component. The method may further comprise connecting at least a portion of the composite component with another metallic component, such as a metallic vehicle component. The disclosure is also directed to a composite component prepared according to the method as described herein.

DETAILED DESCRIPTION

Figure 1:
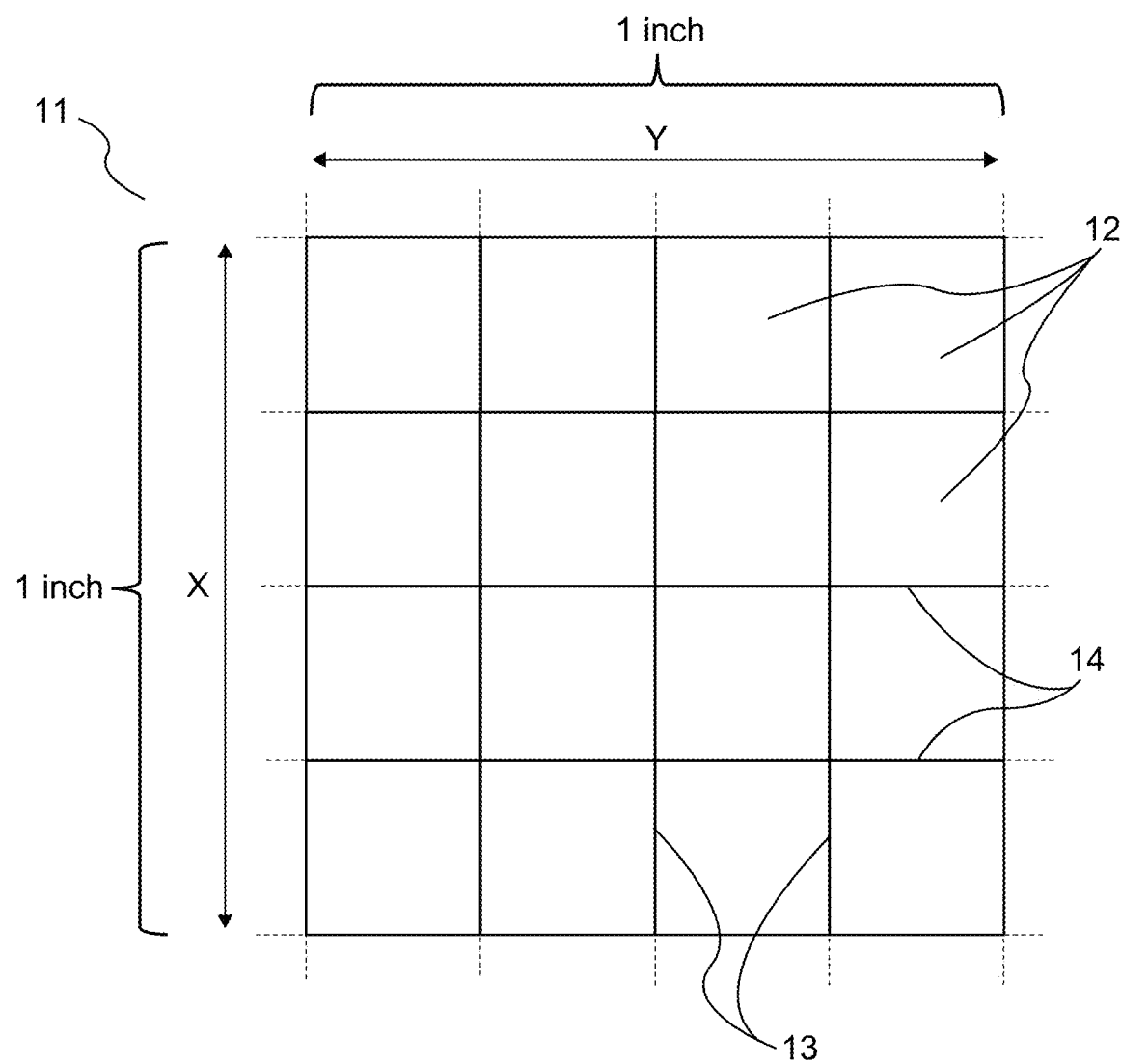
FIG. 1 shows an example mesh according to aspects of the present disclosure.

The present disclosure is directed to a method of joining fiber reinforced composite materials and metallic materials to provide a hybrid composite component. The method may comprise interleaving one or more metallic mesh laminae with two or more laminae of a fiber reinforced composite material, wherein at least a portion of the one or more metallic mesh laminae extends past an edge of the two or more laminae of fiber reinforced composite material. The method may comprise providing one or more laminae of fiber reinforced composite material in a position abutting at least one of the one or more metallic mesh laminae. The method may further comprise stitching interleaved laminae of the resulting composite component and/or curing the resulting composite component. The method may further comprise connecting at least a portion of the composite component with another metallic component, such as a metallic vehicle component. The disclosure is also directed to a composite component prepared according to the method as described herein.

The method comprises interleaving one or more metallic mesh laminae with two or more laminae of a fiber reinforced composite material. As used herein, the term "lamina" refers to a thin layer of a material. It should be understood that the thickness of the laminae will depend at least in part on the laminae material, for example, the nature of the fiber at least partially forming the laminae, the fiber volume fraction, the laminate construction, and/or the composite manufacturing and/or curing process. Generally, each lamina as described here may have a thickness of between about 0.01 mm and 10 mm, optionally between about 0.01 mm and 5 mm, optionally between about 0.01 mm and 2.5 mm, optionally between about 0.5 mm and 2.5 mm, and optionally less than about 0.5 mm, although one or more laminae may have a different thickness depending on the application.

Each lamina of the two or more laminae of a fiber reinforced composite material may individually comprise a composite material having a polymer matrix material and one or more fibers. According to some aspects, the fiber reinforced composite material may comprise a fiber reinforced polymer, that is, an "FRP." As used herein, the term "FRP" or "fiber reinforced polymer" refers to a composite material comprising a polymer matrix material reinforced with fibers. According to some aspects, the fibers may comprise "pre-preg" or "pre-impregnated" composite fibers. As used herein, the term "pre-preg" or "pre-impregnated" composite fibers refer to fibers that have been impregnated with a polymer matrix material prior to curing. It should be understood that as used herein, "curing" may refer to any curing process known in the art compatible with the present disclosure, including but not limited to, heat curing (e.g., via an autoclave), air curing, and combinations thereof.

It should be understood that in the context of the present disclosure, a step of providing a lamina of a fiber reinforced composite material may comprise one or more process steps as known in the art, wherein each of the process steps are immediately subsequent another process step and/or are interspersed with other method steps of the present disclosure, as described herein. For example, according to some aspects, a step of providing a lamina of a fiber reinforced composite material may comprise providing partially cured pre-preg composite fibers in a position relative to other components of the composite component, as described herein. The partially cured pre-preg composite fibers may then be fully cured, for example, when the composite component is cured, as described herein. In this example, the process step of fully curing the pre-preg composite fibers may be immediately subsequent the process step of providing the partially cured pre-preg composite fibers, or it may occur after one or more other method steps as described herein.

Additionally or alternatively, a step of providing a lamina of a fiber reinforced composite material may comprise providing dry fibers in a position relative to other components of the composite component as described herein. A polymer matrix material may then be subsequently provided at any point in the method of the present disclosure prior to curing the composite component, as described herein. For example, a step of providing a lamina of a fiber reinforced composite material may comprise a "wet-layup" process, wherein dry fibers are provided in a position relative to other components of the composite component (for example, via a mold) and a polymer matrix material is brushed and/or rolled onto the fibers prior to curing the composite component. Additionally or alternatively, a step of providing a lamina of a fiber reinforced composite material may comprise providing dry fibers in a position relative to other components of the composite component (for example, via a mold) and subsequently injecting a polymer matrix material prior to curing the composite component. Additionally or alternatively, a step of providing a lamina of a fiber reinforced composite material may comprise providing alternating dry layers of fibers and sheets of a polymer matrix material in a position relative to other components of the composite component (for example, via a mold). The alternating dry layers may then be cured (for example, when the composite component is cured) such that the polymer matrix material comprised by the sheets flow to other portions of the composite component so as to, for example, secure the fibers and/or metallic mesh material in position, as described herein.

It should be understood that each lamina of the two or more laminae of a fiber reinforced composite material may comprise the same fiber reinforced composite material as another lamina of the fiber reinforced composite material and/or may comprise a different fiber reinforced composite material from another lamina of the fiber reinforced composite material. Examples of fibers according to the present disclosure include, but are not limited to, glass fibers, carbon fibers, aramid fibers, basalt fibers, synthetic fibers (e.g., a rigid-rod isotropic crystal polymer that is spun by a dry-jet wet spinning process, such as Zylon® fibers), and combinations thereof. Examples of polymer matrix materials according to the present disclosure include, but are not limited to, epoxy polymers, vinylester polymers, polyester thermosetting plastic polymers, thermoplastic polymers, polyamides, polycarbonates, polyethylenes, polypropylenes, polyurethanes, and combinations thereof.

According to some aspects, the two or more laminae of fiber reinforced composite material may have a first CTE. As used herein, the term "CTE" or "coefficient of thermal expansion" refers to the fractional change in size of a material or component per degree change in temperature at a constant pressure when the material or component is free to expand. According to some aspects, the first CTE may be no more than about 10 ppm/° C., optionally no more than about 9 ppm/° C., optionally no more than about 8 ppm/° C., optionally no more than about 7 ppm/° C., optionally no more than about 6 ppm/° C., optionally no more than about 5 ppm/° C., optionally no more than about 4 ppm/° C., optionally no more than about 3 ppm/° C., optionally no more than about 2 ppm/° C., optionally no more than about 1 ppm/° C., optionally no more than about 0.5 ppm/° C., optionally no more than about 0.1 ppm/° C., optionally no more than about 0.01 ppm/° C., optionally no more than about 0 ppm/° C., and optionally about −1 ppm/° C.

Each of the one or more metallic mesh laminae may comprise a metallic material. In that case wherein the one or more metallic mesh laminae comprises two or more metallic mesh laminae, each of the two or more metallic mesh laminae may be made of the same metallic material or may be made of a different metallic material from at least one other of the two or more metallic mesh laminae. The metallic material may be any metallic material for use in a vehicle part. As used herein, the term "vehicle" refers to any manned or unmanned structure capable of moving and is powered by any form of energy. The term "vehicle" includes, but is not limited to, cars, trucks, vans, minivans, SUVs, motorcycles, scooters, boats, personal watercraft, submersibles, aircraft, and spacecraft. Metallic materials useful according to the present disclosure include, but are not limited to, metals such as gold (Au), platinum (Pt), titanium (Ti), nickel (Ni), iron (Fe), chromium (Cr), aluminum (Al), and alloys thereof, such as steel (including stainless steel). According to some aspects, at least one of the metallic mesh laminae may have a passivated surface, such as stainless steel (e.g., 304 stainless steel), and/or may comprise a structured oxide layer, metal plating, and/or non-conductive coating on at least a portion thereof, such as on the embedded length, as described herein.

According to some aspects, the metallic material comprised by the one or more metallic mesh laminae may comprise a metallic material that is galvanically compatible with other materials comprised by the composite component and/or with another metallic component, as described herein. As used herein, the term "galvanic compatibility" refers to a relationship between two contacting materials wherein oxidation and/or corrosion of the materials is limited when exposed to an electrolyte solution. According to some aspects, "galvanic compatibility" may refer a difference in anodic index between two materials of no more than about 60 mV, optionally no more than about 50 mV, optionally no more than about 40 mV, and optionally no more than about 30 mV. As used herein, an "anodic index" refers to the electrochemical voltage that will be developed between a subject material and gold in the presence of an electrolyte solution. It should be further understood that galvanically incompatible materials refer to materials wherein oxidation and/or corrosion of the materials is not limited when exposed to an electrolyte solution, that is, the opposite of galvanically compatible materials, as described herein.

According to some aspects, the metallic material comprised by the one or more metallic mesh laminae may comprise a metallic material that is galvanically compatible with other materials comprised by the composite component, such as the fiber reinforced composite material comprised by the composite component. Additionally or alternatively, the metallic material comprised by the one or more metallic mesh laminae may comprise a metallic material that is galvanically incompatible with other materials comprised by the composite component, as described herein. Additionally or alternatively, when the composite component of the present disclosure is to be connected with another component that is metallic and/or electrically conductive, such as a metallic vehicle component, at least a portion of the metallic material comprised by the one or more metallic mesh laminae may be galvanically compatible with the metallic component to avoid corrosion amongst the composite component and the metallic component.

According to some aspects, the metallic material comprised by the one or more metallic mesh laminae may have a second CTE. The second CTE may be between the first CTE and a CTE of the metallic component, such as the metallic vehicle component, referred to herein as the third CTE. The difference between the first CTE and the third CTE may be at least about 10 ppm/° C., optionally at least about 11 ppm/° C., optionally at least about 12 ppm/° C., optionally at least about 13 ppm/° C., optionally at least about 14 ppm/° C., optionally at least about 15 ppm/° C., optionally at least about 16 ppm/° C., optionally at least about 17 ppm/° C., optionally at least about 18 ppm/° C., optionally at least about 19 ppm/° C., optionally at least about 20 ppm/° C., optionally at least about 21 ppm/° C., optionally at least about 22 ppm/° C., optionally at least about 23 ppm/° C., optionally at least about 24 ppm/° C., optionally at least about 25 ppm/° C., optionally at least about 26 ppm/° C., and optionally at least about 27 ppm/° C. The second CTE may be between the first CTE and the third CTE, such as a CTE of between about 1 and 25 ppm/° C., optionally between about 1 and 23 ppm/° C., optionally between about 1 and 20 ppm/° C., and optionally between about 10 and 20 ppm/° C.

As used herein, the term "mesh" refers to a structure having regularly spaced openings on at least a portion thereof. For example, a mesh may comprise a structure comprising fibers that are woven or otherwise secured together to form regularly spaced openings therebetween. Alternatively, a mesh may comprise a sheet that has been fully or partially perforated to form regularly spaced openings, such as a perforated metal foil. According to some aspects, a mesh may be characterized in terms of its "mesh count," that is, the number of openings per linear inch in an X and/or Y direction (e.g., parallel with vertical fibers and horizontal fibers, respectively, or vice versa, or in the case of a fully or partially perforated sheet, parallel with the unperforated vertical sections and the unperforated horizontal sections, respectively, or vice versa). For example, FIG. 1 shows an example 4×4 mesh according to the present disclosure. As shown in FIG. 1, a 4×4 mesh 11 is a mesh having four openings 12 in one linear inch in the X direction and four openings in one linear inch in the Y direction. It should be understood that an 8×8 mesh would refer to a mesh having eight openings in one linear inch in the X direction and eight openings in one linear inch in the Y direction, a 20×20 mesh would refer to a mesh having twenty openings in one linear inch in the X direction and twenty openings in one linear inch in the Y direction, and so on. According to some aspects, the mesh according to the present disclosure may have a mesh count of about 4×4, optionally about 8×8, optionally about 12×12, optionally about 20×20, optionally about 28×28, optionally about 88×88, and optionally about 90×90. According to some aspects, the mesh according to the present disclosure may have a mesh count of between about 5×5 and about 20×20, optionally between about 10×10 and about 14×14. According to some aspects, the mesh according to the present disclosure may have a mesh count of between about 80×80 and about 100×100, optionally between about 85×85 and about 90×90. According to some aspects, the mesh according to the present disclosure may have a mesh count no more than about 10×10. According to some aspects, the mesh according to the present disclosure may have a mesh count of at least about 28×28. According to some aspects, the mesh according to the present disclosure may have a mesh count of at least about 90×90.

Figure 2A:
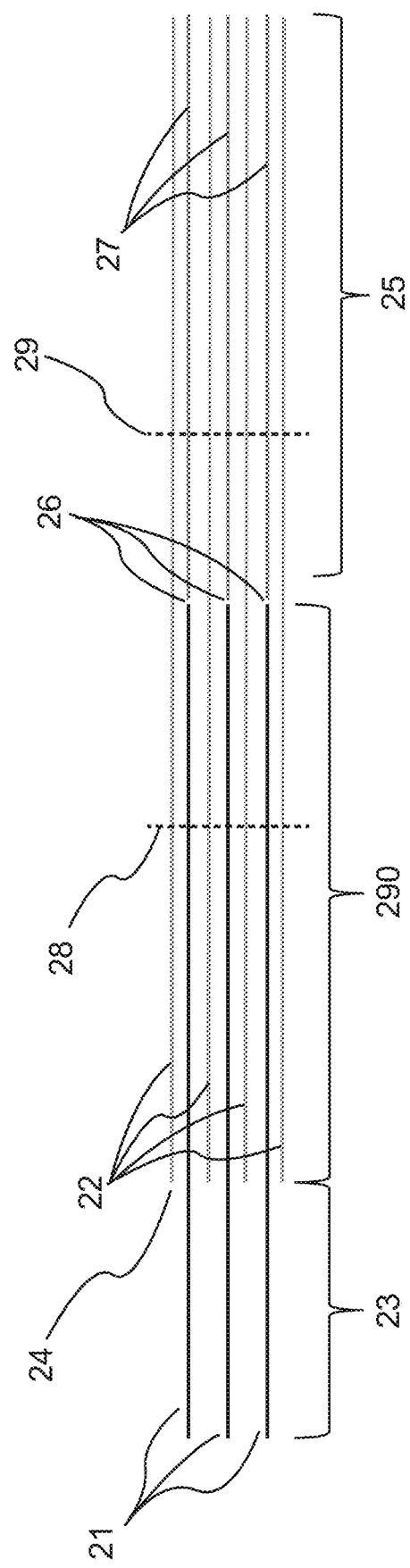
FIG. 2A shows a side view schematic of one or more metallic mesh laminae interleaved with two or more laminae of a fiber reinforced composite material, according to aspects of the present disclosure.

The method comprises interleaving one or more metallic mesh laminae with two or more laminae of fiber reinforced composite material, as described herein. For example, FIG. 2A shows a side view schematic of one or more metallic mesh laminae 21 interleaved with two or more laminae of fiber reinforced composite material 22. As shown in FIG. 2A, at least a portion 23 of the one or more metallic mesh laminae 21 extends past a first edge 24 of the two or more laminae of fiber reinforced composite material 22. In this example, the portion 23 of the one or more metallic mesh laminae 21 may be free of or substantially free of polymer matrix materials as described herein, including, but not limited to, epoxy polymers, vinylester polymers, polyester thermosetting plastic polymer, thermoplastic polymers, and combinations thereof.

Figure 2B:
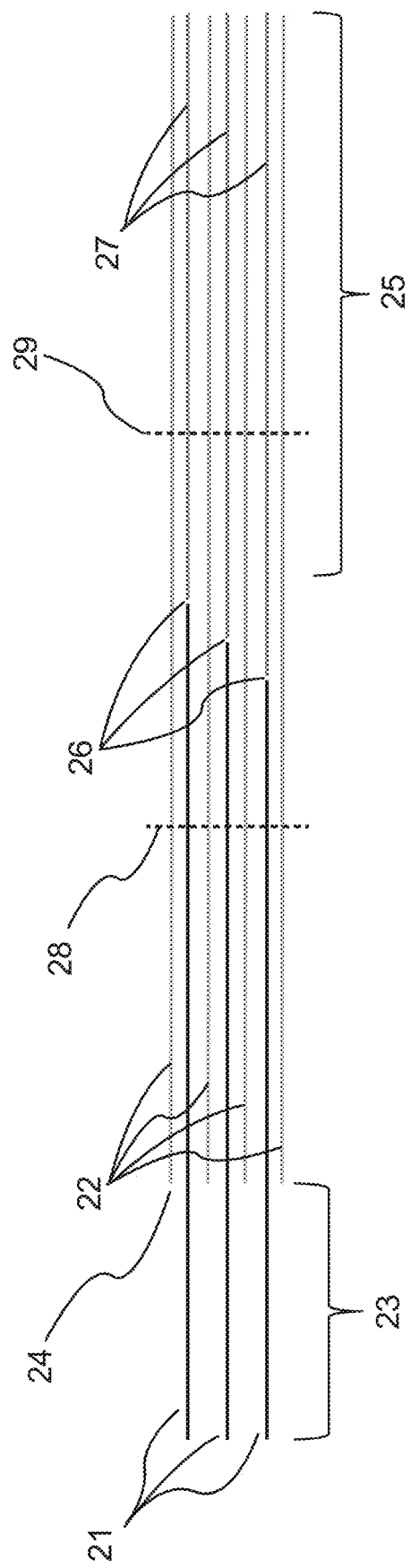
FIG. 2B shows a side view schematic of one or more metallic mesh laminae interleaved with two or more laminae of a fiber reinforced composite material, according to aspects of the present disclosure.

FIG. 2B shows a side view schematic of one or more metallic mesh laminae 21 interleaved with two or more laminae of fiber reinforced composite material 22, similar to the side view schematic shown in FIG. 2A. However, as shown in FIG. 2B, in the case wherein the one or more metallic mesh laminae 21 includes two or more metallic mesh laminae 21, each of the two or more metallic mesh laminae 21 may have a length that is different from the length of at least one other of the two or more metallic mesh laminae 21 such that second edges 26 of the two or more metallic mesh laminae 21 are staggered. In this way, a stack of discontinuities within the hybrid composite component may be avoided.

Figure 2C:
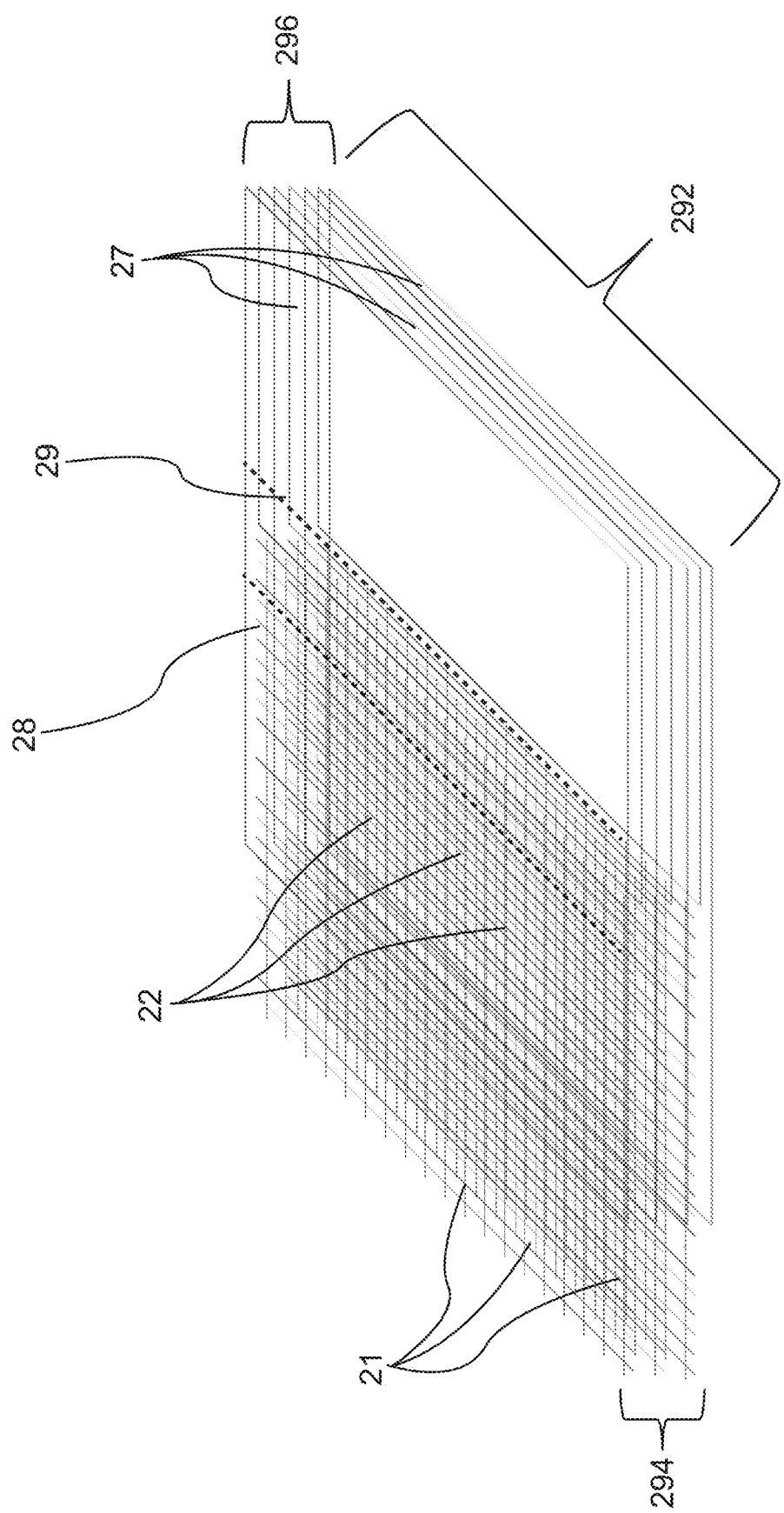
FIG. 2C shows a perspective view schematic of one or more metallic mesh laminae interleaved with two or more laminae of a fiber reinforced composite material and one or more abutting laminae of fiber reinforced composite material, according to aspects of the present disclosure.

As shown in FIGS. 2A and 2B, at least a portion 25 of the two or more laminae of fiber reinforced composite material 22 may extend past a second edge 26 of the one or more metallic mesh laminae 21. It should be understood that the surface area of the interleaved portion of the one or more metallic mesh laminae 21 and the two or more laminae of fiber reinforced composite material 22, or shear area, may be selected in order to provide a desired mechanical strength in the resulting hybrid composite component up to a maximum strength determined by the mechanical properties of the constituent materials. This maximum strength is achieved when the shear are is equal to the critical surface area. This critical surface area is determined by the shear strength of the cured matrix and the tensile strength of the lessor of the combined metal mesh laminae or the combined laminae of the composite component as given by:

$$A_s = \frac{\sigma_u A_c}{\tau_{matrix}}$$

where $\tau_{matrix}$ is the shear strength of the cured matrix, $A_s$ is the critical shear area between the interleaved portion of the one or more metallic mesh laminae 21 and the two or more laminae of fiber reinforced composite material 22, $\sigma_u$ is the ultimate strength of the lesser of the metallic mesh material 21 and the cured composite component, and $A_c$ is the cross-sectional area of the material or component described by $\sigma_u$. Alternatively, the yield stress, denoted by $\sigma_y$, could be used in place of $\sigma_u$ if deemed more appropriate to the overall component design. The relevant areas are calculated by:

$A_s = 2nwL$ and $A_c = wt$ where n is the number of one or more metallic mesh laminae 21, w is the width of the interleaving region 292 in the component (as shown in FIG. 2C), L is the embedded length 290 or the one or more metal mesh laminae, and t is the final thickness of the metal mesh laminae 21 or the composite component in region 25.

The method may also comprise providing one or more laminae of fiber reinforced composite material in a position abutting at least one of the one or more metallic mesh laminae. For example, FIGS. 2A and 2B show one or more laminae of fiber reinforced composite material 27 that abut the second edge 26 of the one or more metallic mesh laminae 21. It should be understood that the one or more laminae of fiber reinforced composite material 27 shown in FIGS. 2A and 2B may comprise an FRP as described herein and may comprise a material that is the same as or different from the two or more laminae of fiber reinforced composite material 22 interleaved with the one or more metallic mesh laminae 21, alternatively referred to herein as "the two or more interleaved laminae of fiber reinforced composite material 22." The one or more laminae of fiber reinforced composite material 27, referred to herein as "the one or more abutting laminae of fiber reinforced composite material 27," may be interleaved with the portion 25 of the two or more interleaved laminae of fiber reinforced composite material 22 that extends past the second edge 26 of the one or more metallic mesh laminae 21, as shown in FIGS. 2A and 2B.

It should be understood that while FIGS. 2A and 2B show alternating laminae of interleaved laminae of fiber reinforced composite material 22 and abutting laminae of fiber reinforced composite material 27 in a 1:1 ratio, this ratio may depend on the thickness of one or more laminae comprised by the composite component. For example, if the one or more metallic mesh laminae 21 each have a thickness that is greater than the thickness of each abutting laminae of fiber reinforced composite material 27, the ratio of interleaved laminae of fiber reinforced composite material 22 to abutting laminae of fiber reinforced composite material 27 may be 1:2, 1:3, 1:4, etc. That is, each of the interleaved laminae of fiber reinforced composite material 22 may be separated from another interleaved lamina of fiber reinforced composite material 22 by one or more abutting laminae of fiber reinforced composite material 27.

The method may further comprise stitching at least a portion of the interleaved laminae of the composite component. For example, FIGS. 2A and 2B show the one or more metallic mesh laminae 21 stitched to the two or more interleaved laminae of fiber reinforced composite material 22 with stitching 28. In this way, the position of the one or more metallic mesh laminae 21 may be secured with respect to the two or more interleaved laminae of fiber reinforced composite material 22. It should be understood that the stitching may be optimized based on the strength required and/or the desired processing time. Examples of materials useful for the stitching include, but are not limited to, polymer yarns and/or fibers compatible with one or more components as described herein, including polyethylene yarns and/or fibers. It should be understood that according to some aspects, the mesh openings in the one or more metallic mesh laminae may facilitate easier stitching when compared with a similar component that does not comprise one or more metallic mesh laminae (e.g., a component that comprises one or more laminae of solid metallic foils). For example, each of the one or more metallic mesh laminae may have a mesh count configured to be used with an automatic stitching process. The mesh count of the one or more metal mesh laminae 21 may be selected in consideration of the strength of the mesh, proportional to metal content, and pitch and/or accuracy of stitching 28. This may be accomplished through varying the mesh count of multiple two or more metal mesh laminae 21 and/or utilizing non-square mesh openings.

Additionally or alternatively, at least a portion of the one or more abutting laminae of fiber reinforced composite material 27 may be stitched to at least a portion of the two or more interleaved laminae of fiber reinforced composite material 22. For example, FIGS. 2A and 2B show the one or more abutting laminae of fiber reinforced composite material 27 stitched to the two or more interleaved laminae of fiber reinforced composite material 22 with stitching 29. In this way, the position of the one or more abutting laminae of fiber reinforced composite material 27 may be secured with respect to the two or more interleaved laminae of fiber reinforced composite material 22. Again, it should be understood that the stitching may be optimized based on the strength required and/or the desired processing time.

FIGS. 3A-E show another side view schematic of one or more metallic mesh laminae 321 interleaved with two or more laminae of fiber reinforced composite material 322, similar to the side view schematics shown in FIGS. 2A and 2B. As shown in FIGS. 3A-E, at least a portion 323 of the one or more metallic mesh laminae 321 extends past a first edge 324 of the two or more laminae of fiber reinforced composite material 322. As shown in FIGS. 3A-E, at least a portion 325 of the two or more laminae of fiber reinforced composite material 322 may extend past a second edge 326 of the one or more metallic mesh laminae 321.

Figure 3A:
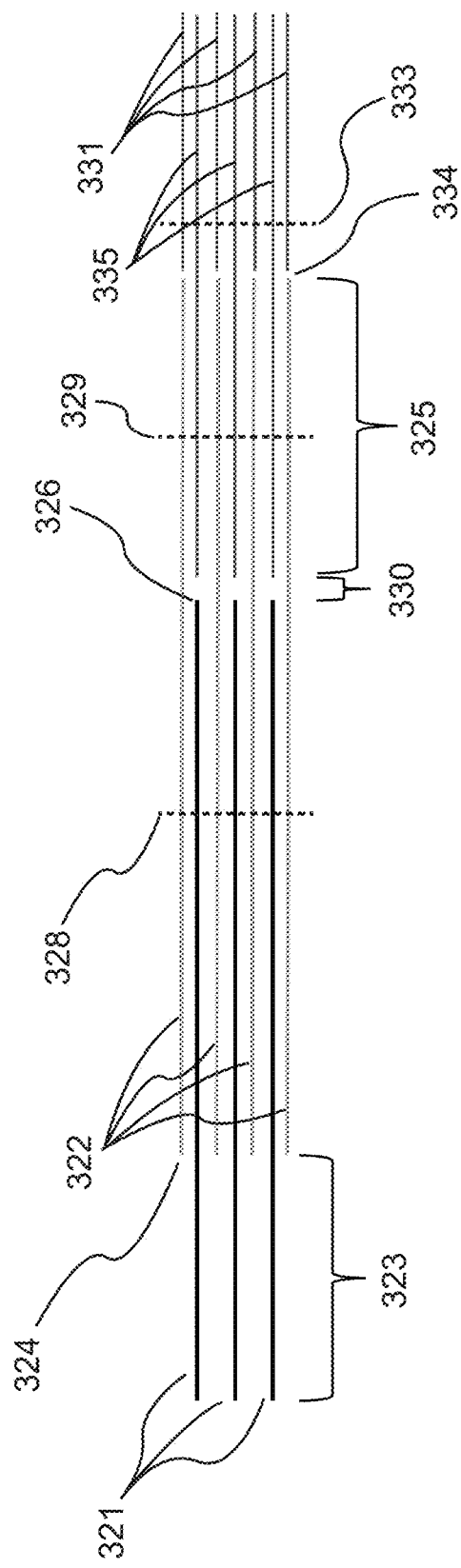
FIG. 3A shows a side view schematic of one or more metallic mesh laminae interleaved with two or more laminae of fiber reinforced composite material, according to aspects of the present disclosure.

As shown in FIG. 3A, one or more laminae of fiber reinforced composite material 335 may be provided proximal to the second edge 326 of the one or more metallic mesh laminae 321. It should be understood that the one or more laminae of fiber reinforced composite material 335 shown in FIG. 3A may comprise an FRP as described herein and may comprise a material that is the same as or different from the two or more laminae of fiber reinforced composite material 322 interleaved with the one or more metallic mesh laminae 321, alternatively referred to herein as "the two or more interleaved laminae of fiber reinforced composite material 322." For example, the one or more laminae of fiber reinforced composite material 335, referred to herein as "the one or more proximal laminae of fiber reinforced composite material 335," may comprise an FRP that is galvanically incompatible with the material comprised by the one or more metallic mesh laminae 321. In this case, the one or more proximal laminae of fiber reinforced composite material 335 may be provided a certain distance from the second edge 326 of the one or more metallic mesh laminae 321, as shown in FIG. 3A. For example, gap 330 may be provided to distance the second edge 326 of the one or more metallic mesh laminae 321 from the one or more proximal laminae of fiber reinforced composite material 335, thereby at least in part reducing or preventing galvanic corrosion within the cured composite component. According to some aspects, gap 330 may provide a distance between the second edge 326 of the one or more metallic mesh laminae 321 and the one or more proximal laminae of fiber reinforced composite material 335 of about 10 mm or less, optionally about 5 mm or less, and optionally about 3 mm or less However, it should be understood that gap 330 may not be necessary in all cases, for example, as shown in FIGS. 3B-E, which show one or more abutting laminae of fiber reinforced composite material 327 (FIG. 3B) and one or more abutting laminae of insulating material 336a and 336b (FIGS. 3C-E).

Figure 3B:
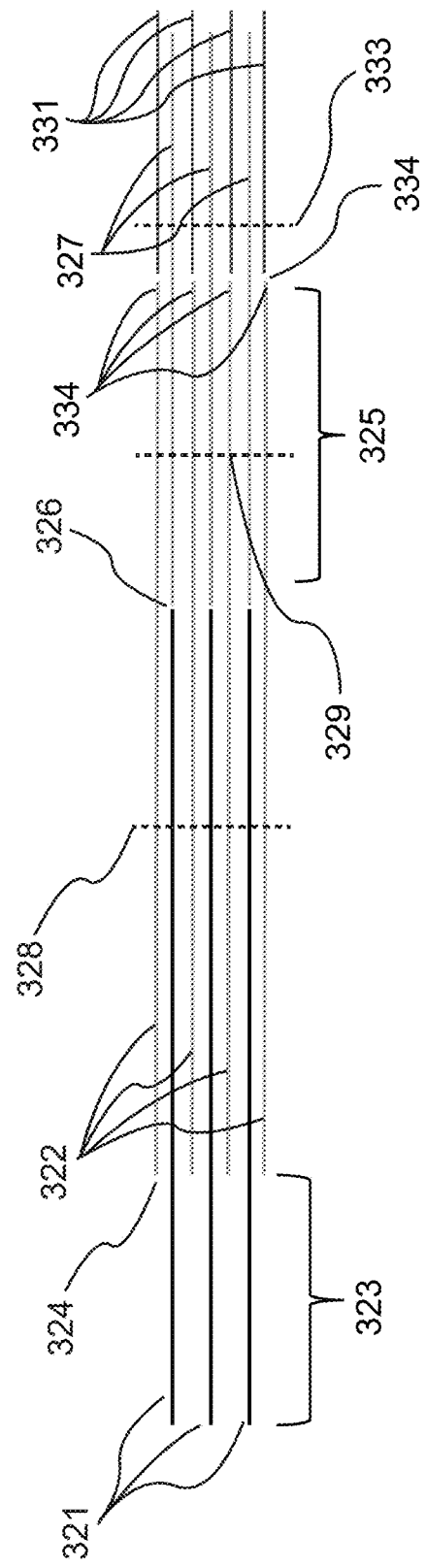
FIG. 3B shows a side view schematic of one or more metallic mesh laminae interleaved with two or more laminae of fiber reinforced composite material, according to aspects of the present disclosure.

As shown in FIG. 3B, the one or more abutting laminae of fiber reinforced composite material 327 may abut or substantially abut the second edge 326 of the one or more metallic mesh laminae 321. In this example, the one or more abutting laminae of fiber reinforced composite material 327 may comprise an FRP that is galvanically compatible with the material comprised by the one or more metallic mesh laminae 321, and as such, gap 330 may not be required to reduce or prevent galvanic corrosion within the cured hybrid composite component.

Figure 3C:
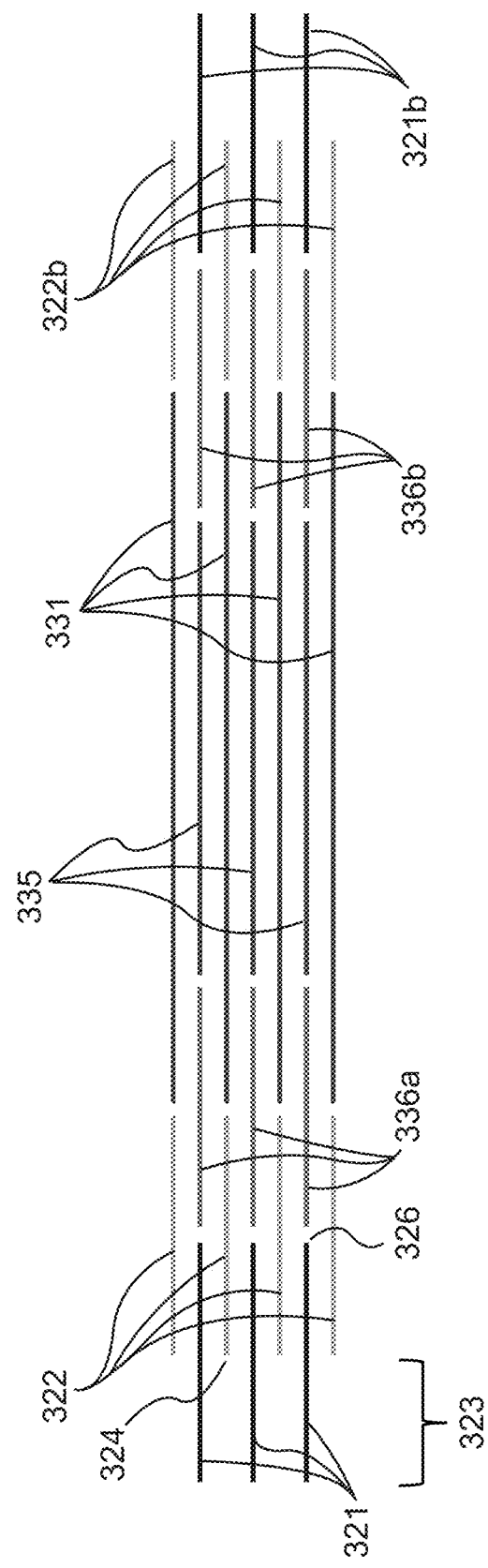
FIG. 3C shows a side view schematic of one or more metallic mesh laminae interleaved with two or more laminae of fiber reinforced composite material, according to aspects of the present disclosure.
Figure 3D:
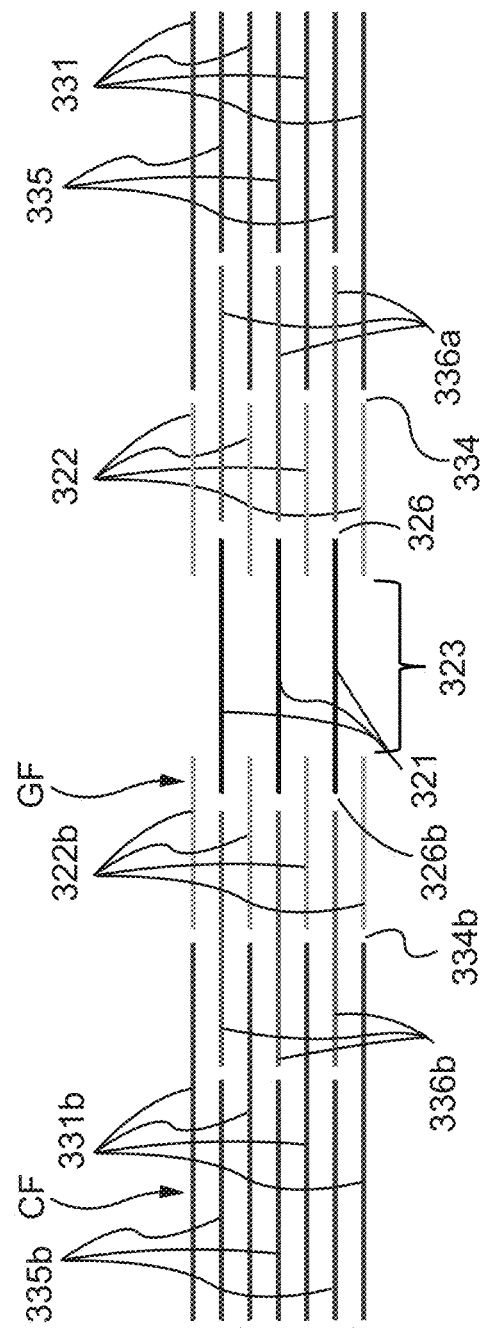
FIG. 3D shows a side view schematic of one or more metallic mesh laminae interleaved with two or more laminae of fiber reinforced composite material, according to aspects of the present disclosure.
Figure 3E:
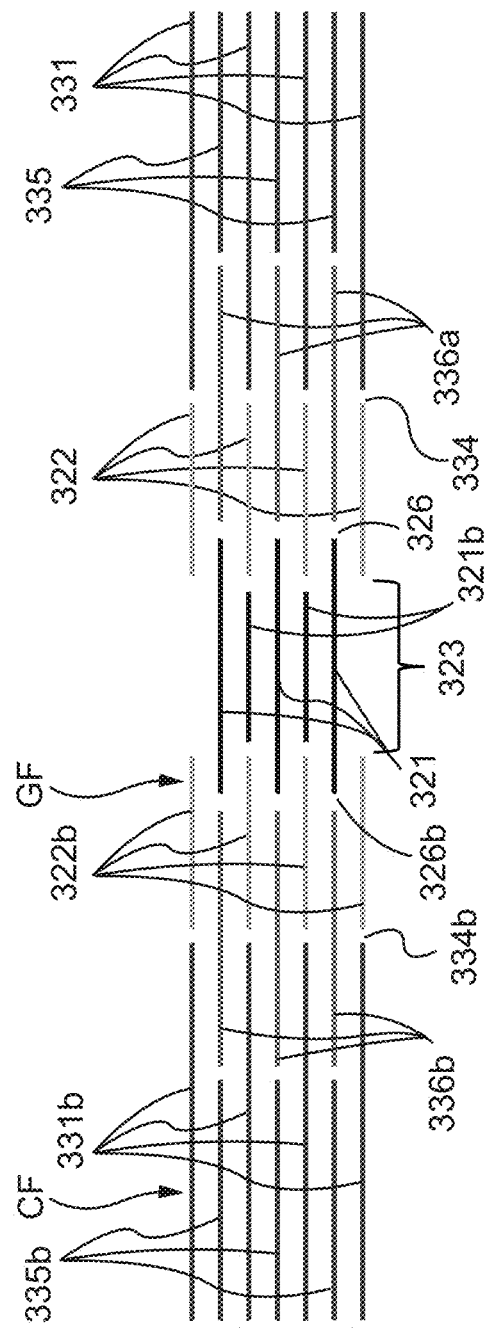
FIG. 3E shows a side view schematic of one or more metallic mesh laminae interleaved with two or more laminae of fiber reinforced composite material, according to aspects of the present disclosure.

In another example, as shown in FIG. 3C-E, one or more proximal laminae of fiber reinforced composite material 335 may be separated from the second edge 326 of the one or more metallic mesh laminae 321 by one or more abutting laminae of insulating material 336a. The one or more abutting laminae of insulating material 336a may comprise an insulating material that is not galvanically incompatible with the material comprised by the one or more metallic mesh laminae 321, and as such, gap 330 (as shown in FIG. 3A) may not be required to reduce or prevent galvanic corrosion within the cured composite component. As used herein, the term "insulating material" refers to a material that impedes the electrical current present during galvanic corrosion from flowing between the one or more laminae of fiber reinforced material 335 and the one or more metallic mesh laminae 321 through its high electrical resistivity. The resistivity of such an insulating material is approximately on the order of $10^9$ ρ (Ω·m) or greater. Example insulating materials useful according to the present disclosure include, but are not limited to, Kevlar, glass, basalt, and combinations thereof. In some non-limiting examples, the insulating materials may be provided in a form selected from the group consisting of fibers, fabrics, and combinations thereof.

As shown in FIGS. 3A-E, at least a first portion of the one or more proximal laminae of fiber reinforced composite material 335, the one or more abutting laminae of fiber reinforced composite material 327, or the one or more abutting laminae of insulating material 336a, may be interleaved with the portion 325 of the two or more interleaved laminae of fiber reinforced composite material 322 that extends past the second edge 326 of the one or more metallic mesh laminae 321. Additionally or alternatively, at least a second portion of the one or more proximal laminae of fiber reinforced composite material 335, the one or more abutting laminae of fiber reinforced composite material 327, or the one or more abutting laminae of insulating material 336a may be interleaved with two or more additional laminae of fiber reinforced composite material 331. The two or more additional laminae of fiber reinforced composite material 331 may abut or substantially abut an edge 334 of the two or more interleaved laminae of fiber reinforced composite material 322 and may comprise an FRP as described herein. According to some aspects, the two or more additional laminae of fiber reinforced composite material 331 may comprise an FRP that is galvanically incompatible with the material comprised by the one or more metallic mesh laminae 321. However, it should be understood that because the one or more metallic mesh laminae 321 are not in contact with the two or more additional laminae of fiber reinforced composite material 331, galvanic corrosion within the cured composite component should not occur.

In addition to the one or more metallic mesh laminae 321 interleaved with two or more laminae of fiber reinforced composite material 322, FIG. 3C also shows a second set of one or more metallic mesh laminae 321b interleaved with a second set of two or more laminae of fiber reinforced composite material 322b. It should be understood that while FIG. 3C shows the second set of one or more metallic mesh laminae 321b interleaved with the second set of two or more laminae of fiber reinforced composite material 322b and abutting a second set of one or more abutting laminae of insulating material 336b, any configuration as described herein in relation to the one or more metallic mesh laminae 321 may be applied to the second set of one or more metallic mesh laminae 321b interleaved with a second set of two or more laminae of fiber reinforced composite material 322b, such as, for example, the configuration shown in FIG. 3A having a gap and/or the configuration shown in FIG. 3B having one or more abutting laminae of fiber reinforced composite material. Furthermore, the second set of one or more metallic mesh laminae 321b may be connected with a metallic vehicle component by any process suitable for use with the present disclosure, as described herein. The metallic vehicle component connected with the one or more metallic mesh laminae 321b may be the same or different from the metallic vehicle component connected with the one or more metallic mesh laminae 321, as described herein.

FIG. 3D shows another side view schematic of one or more metallic mesh laminae 321 interleaved with two or more interleaved laminae of fiber reinforced composite material 322 as described herein. Similar to the example shown in FIG. 3C, FIG. 3D shows one or more proximal laminae of fiber reinforced composite material 335 separated from a second edge 326 of the one or more metallic mesh laminae 321 by one or more abutting laminae of insulating material 336a. FIG. 3D also shows two or more additional laminae of fiber reinforced composite material 331 abutting or substantially abutting an edge 334 of the two or more interleaved laminae of fiber reinforced composite material 322. The example shown in FIG. 3D further comprises one or more metallic mesh laminae 321 interleaved with two or more second interleaved laminae of fiber reinforced composite material 322b, similar to the two or more interleaved laminae of fiber reinforced composite material 322. FIG. 3D also shows one or more second proximal laminae of fiber reinforced composite material 335b separated from a first edge 326b of the one or more metallic mesh laminae 321 by one or more second abutting laminae of insulating material 336b. FIG. 3D also shows two or more second additional laminae of fiber reinforced composite material 331b abutting or substantially abutting an edge 334b of the two or more second interleaved laminae of fiber reinforced composite material 322b. From this example, it should be clear that the two or more second interleaved laminae of fiber reinforced composite material 322b, the one or more second abutting laminae of insulating material 336b, the two or more second additional laminae of fiber reinforced composite material 331b, and/or the one or more second proximal laminae of fiber reinforced composite material 335b may be provided at or proximal to the first edge 326b of the one or more metallic mesh laminae 321 in a configuration that essentially mirrors one or more configurations described herein in regard to the laminae at or proximal to the second edge 326 of the one or more metallic mesh laminae 321. It should also be understood that at least a portion 323 of the one or more metallic mesh laminae 321 should remain exposed as shown in FIG. 3D such that it may be connected with a metallic vehicle component, as described herein.

FIG. 3E shows another side view schematic similar to the schematic shown in FIG. 3D. It should be understood that a detailed description of FIG. 3E would be essentially redundant with the description of FIG. 3D provided above and is thus not included. However, it should be understood that unlike the example shown in FIG. 3D, the example shown in FIG. 3E further includes one or more second metallic mesh laminae 321b interleaved with the one or more metallic mesh laminae 321. The one or more second metallic mesh laminae 321b may abut or substantially abut the two or more interleaved laminae of fiber reinforced composite material 322 and/or the two or more second interleaved laminae of fiber reinforced composite material 322b, as shown in FIG. 3E.

As shown in FIGS. 3A and 3B, the one or more metallic mesh laminae 321 may be stitched to the two or more interleaved laminae of fiber reinforced composite material 322 with stitching 328, as described herein. Additionally or alternatively, stitching 333 and/or stitching 329 may be provided, similar to stitching 328, in order to secure respective laminae, as shown in FIGS. 3A and 3B and as described herein. While not shown, similar stitching may be provided to the laminae shown in FIGS. 3C-E.

Figure 2D:
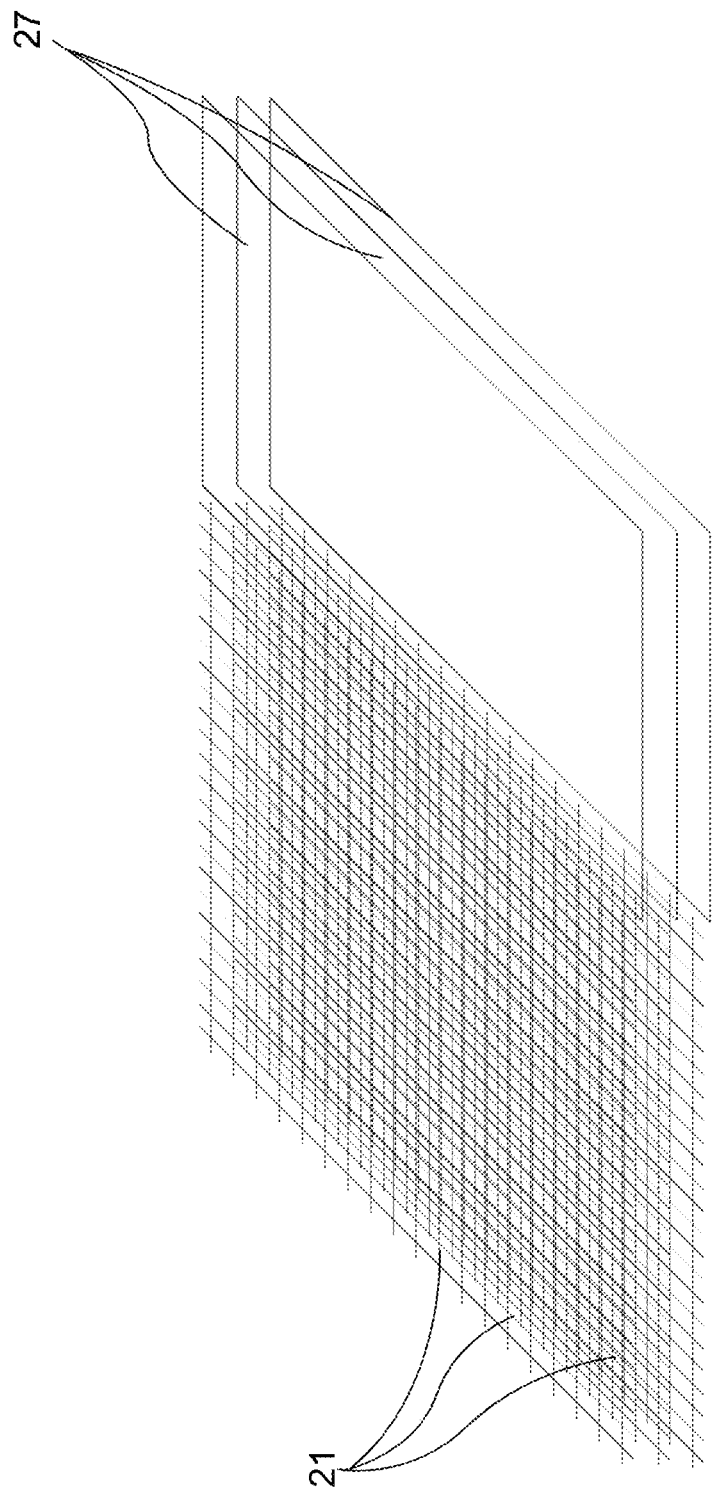
FIG. 2D shows a perspective view schematic of one or more metallic mesh laminae abutting two or more laminae of a fiber reinforced composite material, according to aspects of the present disclosure.

FIG. 2C shows a perspective view of the schematic shown in FIG. 2A or 2B. In particular, FIG. 2C shows the one or more metallic mesh laminae 21, the two or more interleaved laminae of fiber reinforced composite material 22, the one or more abutting laminae of fiber reinforced composite material 27, stitching 28, and stitching 29, as described in relation to FIGS. 2A and 2B. For visualization, FIG. 2D shows another perspective view of the schematic shown in FIGS. 2A and 2B without the two or more interleaved laminae of fiber reinforced composite material 22, stitching 28, or stitching 29.

Figure 5:
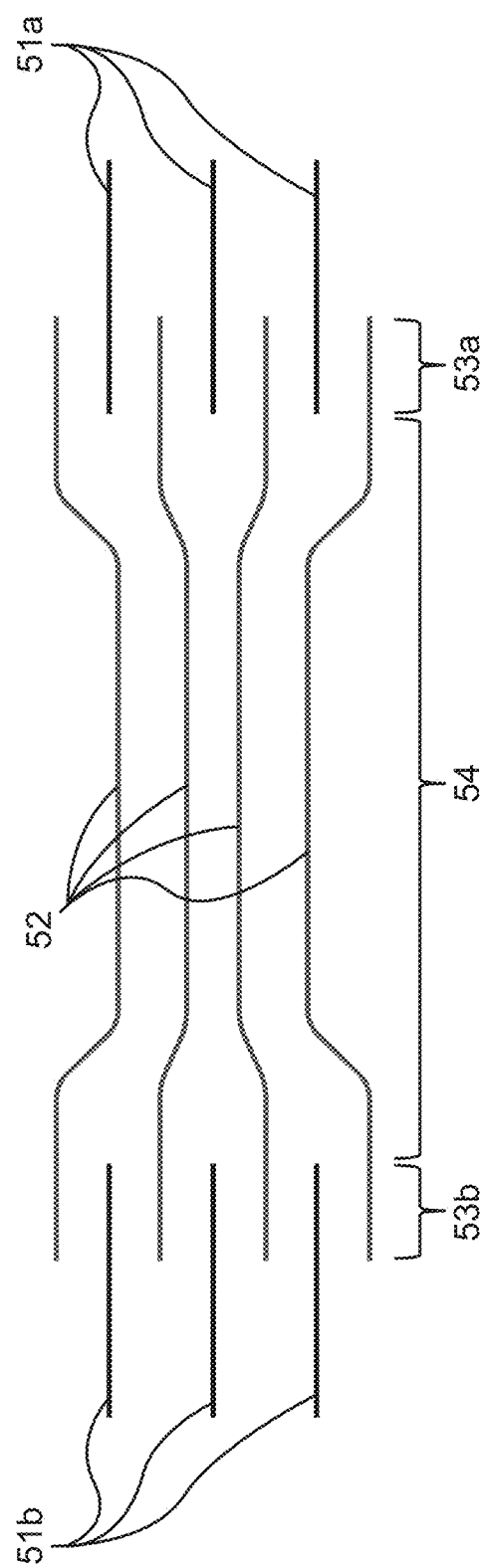
FIG. 5 shows a side view schematic of a hybrid composite component having one or more metallic mesh laminae, one or more second metallic mesh laminae, and two or more interleaved laminae of fiber reinforced composite material, according to aspects of the present disclosure.

FIG. 5 shows another side view schematic of a composite component having one or more metallic mesh laminae 51a and one or more second metallic mesh laminae 51b, similar to the example shown, for example, in FIG. 3C. However, unlike the example shown in FIG. 3C, the example shown in FIG. 5 does not comprise, for example, one or more proximal laminae of fiber reinforced composite material and/or one or more abutting laminae of insulating material. Rather, as shown in FIG. 5, this example comprises two or more interleaved laminae of fiber reinforced composite material 52 that are interleaved with the one or more metallic mesh laminae 51a and the one or more second metallic mesh laminae 51b at portions 53a and 53b thereof, respectively. The non-interleaved portion 54 of the two or more interleaved laminae of fiber reinforced composite material 52 may not be separated from one another by any other laminae. That is, as shown in FIG. 5, each of the two or more interleaved laminae of fiber reinforced composite material 52 may be proximal at least one other of the two or more interleaved laminae of fiber reinforced composite material 52 at the non-interleaved portion 54 thereof.

The stitched and/or non-stitched interleaved laminae as described herein may be referred to as a hybrid composite component. The method may further comprise curing the hybrid composite component. It should be understood that according to some aspects, at least a portion of the polymer matrix material comprised by the two or more interleaved laminae of fiber reinforced composite material may seep into or otherwise occupy at least a portion of the mesh openings of the embedded length of the one or more metallic mesh laminae (i.e., the portion of the one or more metallic mesh laminae interleaved and thus in contact with the two or more interleaved laminae of fiber reinforced composite material) prior to curing and/or upon curing. Upon curing, the cured polymer matrix material occupying the mesh openings may at least in part mechanically interlock the mesh within the cured polymer matrix material. In this way, the position of the one or more metallic mesh laminae with respect to the two or more interleaved laminae may be more reliably secured as compared with a similar composite component wherein the polymer matrix material does not occupy mesh openings. According to some aspects, the at least a portion of the one or more metallic mesh laminae that extends past the first edge of the two or more interleaved laminae of fiber reinforced composite material may be free of or substantially free of polymer matrix material before and/or after curing. The method may additionally or alternatively comprise any other further processing steps known in the art and compatible with the present disclosure, such as draping and/or trimming processes.

The method may further comprise connecting at least a portion of the hybrid composite component with another component, such as a metallic vehicle component.

Figure 2E:
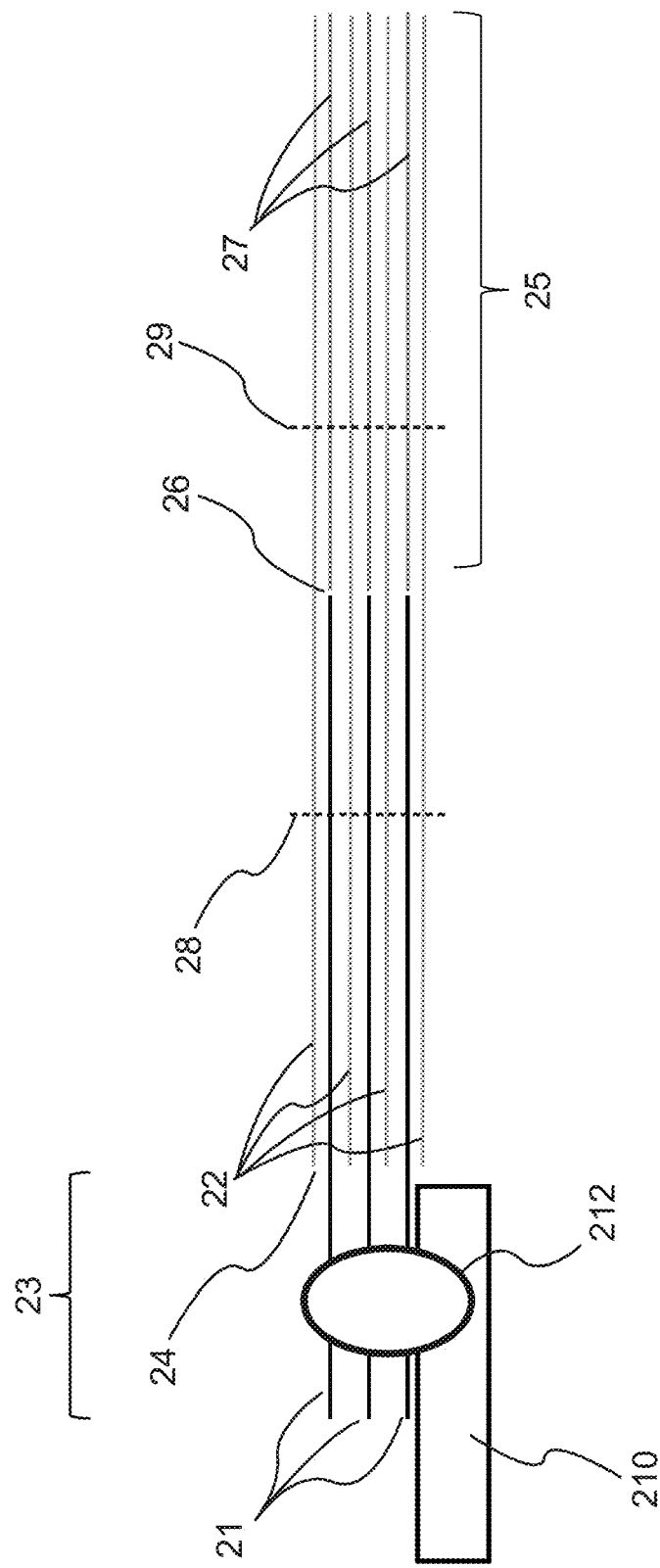
FIG. 2E shows the example composite component shown in FIGS. 2A and 2B connected to a metallic vehicle component, according to aspects of the present disclosure.

For example, FIG. 2E shows the hybrid composite component shown in FIGS. 2A and 2B connected to a metallic vehicle component 210. The metallic vehicle component 210 may be any metallic component useful for a vehicle part, including, for example, a structural component. The metallic vehicle component may have a third CTE that is different from the first CTE and the second CTE. For example, according to some aspects, the third CTE may be at least about 15 ppm/° C., optionally at least about 16 ppm/° C., optionally at least about 17 ppm/° C., optionally at least about 18 ppm/° C., optionally at least about 19 ppm/° C., optionally at least about 20 ppm/° C., optionally at least about 21 ppm/° C., optionally at least about 22 ppm/° C., optionally at least about 23 ppm/° C., optionally at least about 24 ppm/° C., optionally at least about 25 ppm/° C., optionally at least about 26 ppm/° C., optionally at least about 27 ppm/° C., optionally at least about 28 ppm/° C., optionally at least about 29 ppm/° C., and optionally at least about 30 ppm/° C. According to some aspects, the third CTE may be from about 5 ppm/° C. to about 23 ppm/° C., optionally from about 6 ppm/° C. to about 22 ppm/° C., optionally from about 7 ppm/° C. to about 21 ppm/° C., optionally from about 8 ppm/° C. to about 20 ppm/° C., optionally from about 9 ppm/° C. to about 19 ppm/° C., optionally from about 10 ppm/° C. to about 18 ppm/° C., and optionally from about 11 ppm/° C. to about 17 ppm/° C.

As shown in FIG. 2E, the method may further comprise connecting at least a portion of the composite component with the metallic vehicle component 210, and in particular, connecting at least portion 23 of the one or more metallic mesh laminae 21 with the metallic vehicle component 210. The portion of the composite component, such as portion 23 of the one or more metallic mesh laminae 21, may be connected with the metallic vehicle component 210 by any process suitable for use with the present disclosure. For example, the portion of the composite component, such as portion 23 of the one or more metallic mesh laminae 21, may be connected with the metallic vehicle component 210 by a process that includes resistance spot welding (RSW), projection welding (PW), and/or other metal-metal joining techniques known in the art, such as solid-state welding, fusion welding, soldering, brazing, mechanical fasteners, and adhesive joining, or a combination thereof, which may provide a joint 212. It should be understood that the one or more metallic mesh laminae described in relation to any of FIGS. 2A-2D, 3A-3E, and 5 may be connected to a metallic vehicle component as described herein.

It should be understood that the method as described herein may be used to provide a composite component that reduces thermal strain and resulting stresses that occur with the use of similar components that are not prepared by the method of the present disclosure. In particular, by selecting metallic mesh laminae that have a CTE between that of the metallic vehicle component and the fiber reinforced composite material as described herein, the difference in thermal strain and resulting stresses during any downstream thermal processes, such as painting, and in the end-use environment may be reduced. It should be understood that the method of the present disclosure thus enables metal-metal joining techniques to join composite components containing fiber reinforced composite materials to metallic structures, such as metallic vehicle components. Furthermore, the interleaving, stitching, and curing of the laminae of fiber reinforced composite material and the metallic mesh laminae enables a strong joint that engages the composite fibers while enabling joining that does not reduce the strength of the cured composite component.

Figure 4:
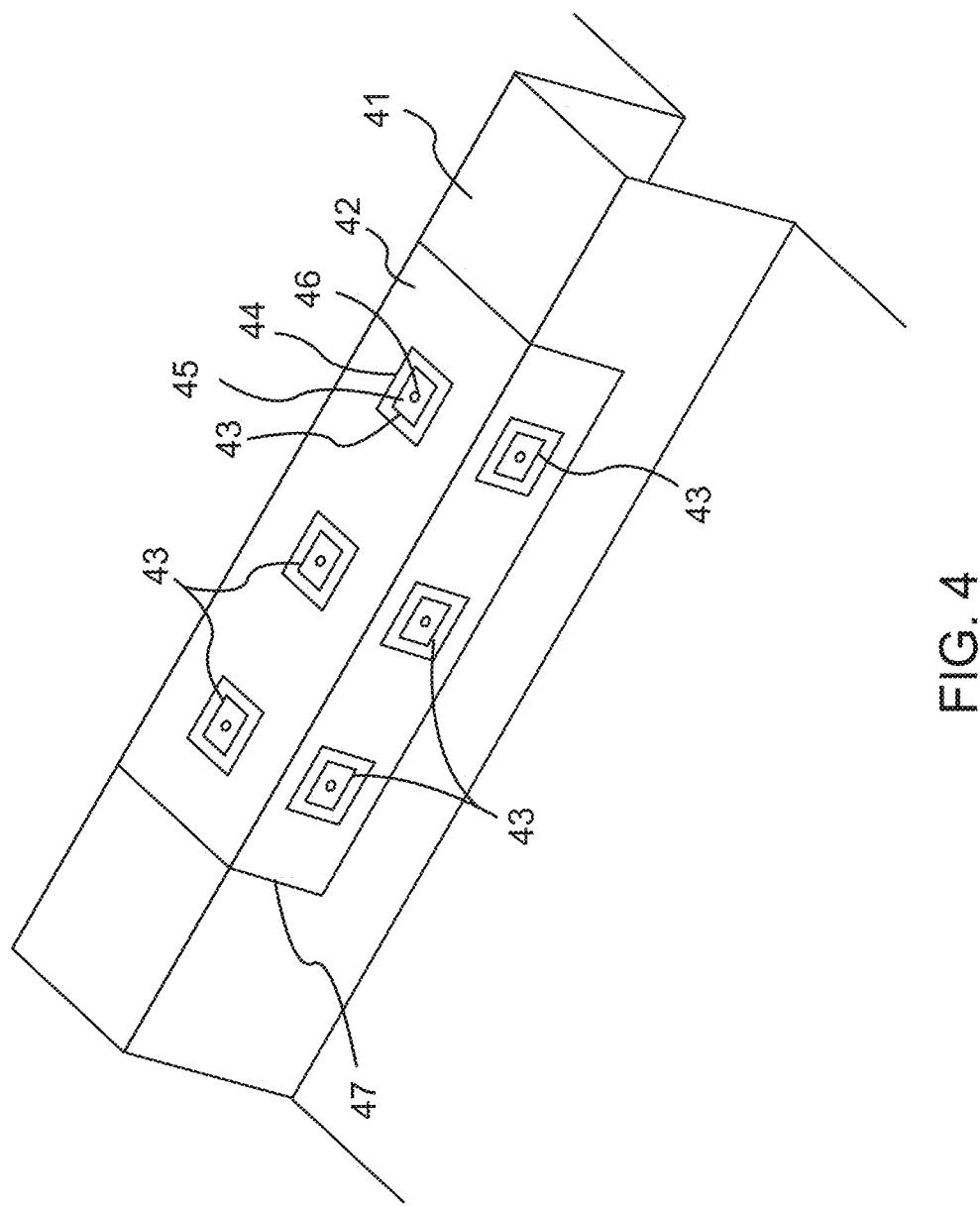
FIG. 4 shows an example application of a composite component according to aspects of the present disclosure.

FIG. 4 shows one example application of the composite component as described herein. In particular, FIG. 4 shows a metallic vehicle component, specifically, a metal transmission tunnel 41 comprising a metallic material as described herein. FIG. 4 also shows a reinforcement patch 42, for example, a patch used to reinforce and/or repair the metal transmission tunnel 41. According to some aspects, the reinforcement patch 42 may comprise a fiber reinforced composite material as described herein. Reinforcement patch 42 may further comprise one or more hybrid composite components 43 as described herein. Each of the one or more hybrid composite components 43 may independently be provided in any configuration as described herein, including but not limited to the configuration described in relation to FIGS. 3D and 3E, wherein laminae of fiber reinforced composite material and/or laminae of insulating material 44 (as shown in FIG. 4) substantially surround one or more metallic mesh laminae 45. The one or more metallic mesh laminae 45 may independently comprise a metallic material as described herein, which may be the same metallic material as the metallic material comprised by the metal transmission tunnel 41 or may be a different metallic material from the metallic material comprised by the metal transmission tunnel 41. According to some aspects, the two metallic materials are galvanically compatible. The one or more metallic mesh laminae 45 and the metal transmission tunnel 41 may be connected to form a joint 46 as described herein, for example, by a process that includes resistance spot welding (RSW). It should be understood that while not shown in FIG. 4, one or more edges 47 of the reinforcement patch 42 may further comprise one or more hybrid composite components as described herein so as to provide additional joints as described herein.

The method of the present disclosure may further provide for increased corrosion resistance between carbon fiber composites and metal structures, vehicle components having a lightweight, multi-material body construction, more robust integration of composite structures, a reduced part count, and/or reduced manufacturing costs by preserving current joining infrastructure.

The present disclosure is also directed to hybrid composite components as described herein. For example, the hybrid composite component may comprise one or more metallic mesh laminae, two or more interleaved laminae of fiber reinforced composite material, one or more abutting laminae of fiber reinforced composite material, one or more proximal laminae of fiber reinforced composite material, and/or two or more additional laminae of fiber reinforced composite material, as described herein. It should be understood that one or more of the laminae as described herein may have a homogenous or substantially homogenous constitution. As used herein, a "homogenous constitution" refers to a composition that is approximately the same throughout. For example, one or more of the laminae may have a homogenous constitution such that each portion of the laminae has about the same composition as any other portion of the laminae.

The hybrid composite component may further comprise stitching as described herein and/or a metallic vehicle component, as described herein. The composite component may be, for example, a vehicle part, such as an automobile part.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

As used herein, the term "about" and "approximately" and "substantially" are defined to being close to as understood by one of ordinary skill in the art. In one non-limiting embodiment, the term "about" and "approximately" are defined to be within 10%, preferably within 5%, more preferably within 1%, and most preferably within 0.5%.

What is claimed is:

1. A method of making a hybrid composite component, the method comprising:
    interleaving one or more metallic mesh laminae with two or more interleaved laminae comprising a first fiber reinforced composite material,
        wherein interleaving the one or more metallic mesh laminae with the two or more interleaved laminae of the first fiber reinforced composite material comprises:
            providing fibers in a position relative to the one or more metallic mesh laminae;
            providing a polymer matrix material in a position relative to the one or more metallic mesh laminae; and
            curing the fibers and the polymer matrix material to form the first fiber reinforced composite material,
        wherein at least a first portion of the one or more metallic mesh laminae extends past a first edge of the two or more interleaved laminae of the first fiber reinforced composite material, and
        wherein at least a second portion of the two or more interleaved laminae of the first fiber reinforced composite material extends past a second edge of the one or more metallic mesh laminae; and
    providing one or more abutting laminae of a second fiber reinforced composite material in a position abutting the second edge of the one or more metallic mesh laminae,
        wherein the one or more abutting laminae of the second material are interleaved with the second portion of the two or more interleaved laminae of the first fiber reinforced composite material.

2. The method according to claim 1, the method further comprising connecting the first portion of the one or more metallic mesh laminae with a metallic vehicle component.

3. The method according to claim 2, wherein the two or more interleaved laminae of the first fiber reinforced composite material have a first CTE, the one or more metallic mesh laminae have a second CTE, and the metallic vehicle component has a third CTE, and
    wherein the second CTE is between the first CTE and the third CTE.

4. The method according to claim 2, wherein the first portion of the one or more metallic mesh laminae and the metallic vehicle component are joined via resistance spot welding.

5. The method according to claim 2, wherein the first portion of the one or more metallic mesh laminae and the metallic vehicle component are joined via projection welding, soldering, brazing, fusion welding, mechanical fasteners, adhesive joining, or a combination thereof.

6. The method according to claim 1, wherein the one or more metallic mesh laminae comprises a metallic material selected from the group consisting of steel, Au, Pt, Ti, Ni, Fe, Cr, Al, Mg, and alloys thereof.

7. The method according to claim 1, wherein the first fiber reinforced composite material is the same as the second fiber reinforced composite material.

8. The method according to claim 7, wherein the first and second fiber reinforced composite materials comprise a fiber reinforced polymer, the fiber reinforced polymer comprising the polymer matrix material reinforced with the fibers,
    wherein the polymer matrix material is selected from the group consisting of epoxy polymers, vinylester polymers, polyester thermosetting plastic polymers, thermoplastic polymers, and combinations thereof, and
    wherein the fibers are selected from the group consisting of glass fibers, carbon fibers, aramid fibers, basalt fibers, synthetic fibers, natural fibers, and combinations thereof.

9. The method according to claim 1, wherein:
    the one or more metallic mesh laminae comprises a metallic material;
    the first fiber reinforced composite material comprises a first fiber reinforced polymer, the first fiber reinforced polymer comprising the polymer matrix material reinforced with the fibers; and
    the metallic material and the first fiber reinforced polymer are galvanically compatible.

10. The method according to claim 1, wherein the one or more metallic mesh laminae has a mesh count configured for use with an automatic stitching process.

11. The method according to claim 1, wherein the fibers are pre-preg composite fibers impregnated with the polymer matrix material such that providing the fibers in the position relative to the one or more metallic mesh laminae and providing the polymer matrix material in the position relative to the one or more metallic mesh laminae is performed in a single step.

12. A method of making a hybrid composite component, the method comprising:
    interleaving one or more metallic mesh laminae with two or more interleaved laminae of a first fiber reinforced composite material, wherein interleaving the one or more metallic mesh laminae with the two or more interleaved laminae of the first fiber reinforced composite material comprises:
    providing fibers in a position relative to the one or more metallic mesh laminae;
    providing a polymer matrix material in a position relative to the one or more metallic mesh laminae; and
    curing the fibers and the polymer matrix material,
wherein the one or more metallic mesh laminae comprises a metallic material,
wherein at least a first portion of the one or more metallic mesh laminae extends past a first edge of the two or more interleaved laminae of the first fiber reinforced composite material, and
wherein at least a second portion of the two or more interleaved laminae of the first fiber reinforced composite material extends past a second edge of the one or more metallic mesh laminae; and
providing one or more proximal laminae of a second fiber reinforced composite material in a position proximal to the second edge of the one or more metallic mesh laminae,
    wherein the at least a portion of the one or more proximal laminae of the second fiber reinforced composite material are interleaved with the second portion of the two or more interleaved laminae of the first fiber reinforced composite material,
    wherein the second fiber reinforced composite material is galvanically incompatible with the metallic material, and
    wherein a gap is provided between the one or more proximal laminae of the second fiber reinforced composite material and the second edge of the one or more metallic mesh.

13. A method of making a hybrid composite component, the method comprising:
interleaving one or more metallic mesh laminae with two or more interleaved laminae comprising a first fiber reinforced composite material,
    wherein interleaving the one or more metallic mesh laminae with the two or more interleaved laminae of the first fiber reinforced composite material comprises:
        providing fibers in a position relative to the one or more metallic mesh laminae;
        providing a polymer matrix material in a position relative to the one or more metallic mesh laminae; and
        curing the fibers and the polymer matrix material,
    wherein at least a first portion of the one or more metallic mesh laminae extends past a first edge of the two or more interleaved laminae of the first fiber reinforced composite material, and
    wherein at least a second portion of the two or more interleaved laminae of the first fiber reinforced composite material extends past a second edge of the one or more metallic mesh laminae.

* * * * *